(12) United States Patent  (10) Patent No.: US 7,177,480 B2
Ikeda et al.  (45) Date of Patent: Feb. 13, 2007

(54) GRAPHIC PROCESSING METHOD AND DEVICE

(75) Inventors: Takahiro Ikeda, Kanagawa (JP); Koji Hashimoto, Kanagawa (JP); Takeshi Ito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/875,295

(22) Filed: Jun. 25, 2004

(65) Prior Publication Data

US 2005/0024361 A1 Feb. 3, 2005

(30) Foreign Application Priority Data

Jun. 27, 2003 (JP) .............................. 2003-185365
Jun. 10, 2004 (JP) .............................. 2004-172752

(51) Int. Cl.
*G06K 9/42* (2006.01)
*G09G 5/00* (2006.01)

(52) U.S. Cl. ...................................... 382/259; 345/619
(58) Field of Classification Search ................ 382/259, 382/256; 345/619
See application file for complete search history.

(56) References Cited

U.S. PATENT DOCUMENTS

| 3,069,654 A |   | 12/1962 | Hough |
| 4,868,871 A | * | 9/1989 | Watson, III ................. 382/103 |
| 5,644,655 A | * | 7/1997 | Windsor ..................... 382/209 |
| 5,796,868 A |   | 8/1998 | Dutta-Choudhury |
| 5,845,007 A |   | 12/1998 | Ohashi et al. |
| 6,122,397 A |   | 9/2000 | Lee et al. |

(Continued)

FOREIGN PATENT DOCUMENTS

CN 1261969 A 8/2000

(Continued)

OTHER PUBLICATIONS

Prasad, "Morphological Analysis of Shapes," CNLS Newsletter (Jul. 1997), 139:1-18.

(Continued)

*Primary Examiner*—Kee M. Tung
*Assistant Examiner*—Michelle K. Lay
(74) *Attorney, Agent, or Firm*—Finnegan, Henderson, Farabow, Garrett & Dunner, L.L.P.

(57) ABSTRACT

There is disclosed a graphic processing method in which a first figure skeleton apart from an outline of a figure by each equal distance in a central direction of the figure is calculated using at least one of a medial axis and a chordal axis with respect to a figure representing the outline of the object shape reflected in a digital image by a set of points, branch lines to the skeleton from a vertex of the figure in the calculated first figure skeleton are removed to obtain a second figure skeleton, and a curve coordinate system is defined using the second figure skeleton as one coordinate axis and using a distance between the second figure skeleton and the outline of the figure as the other coordinate axis with respect to data obtained by one circulation of the outline of the figure using one end point of the second figure skeleton as a start point and using the other end point as a terminal point to transform the coordinate of points on the outline of the figure into the other coordinate axis of the curve coordinate system.

22 Claims, 12 Drawing Sheets

U.S. PATENT DOCUMENTS

| | | | |
|---|---|---|---|
| 6,133,921 A * | 10/2000 | Turkiyyah et al. | 345/420 |
| 6,393,159 B1 * | 5/2002 | Prasad et al. | 382/259 |
| 6,563,324 B1 | 5/2003 | Nichani | |
| 6,859,911 B1 * | 2/2005 | Herasimchuk | 715/764 |
| 2004/0096092 A1 | 5/2004 | Ikeda | |

FOREIGN PATENT DOCUMENTS

| | | |
|---|---|---|
| JP | 2000-293690 | 10/2000 |
| JP | 2001-338304 | 12/2001 |
| JP | 2002-31525 | 1/2002 |
| JP | 2003-016463 | 1/2003 |
| JP | 2003-31469 | 1/2003 |
| JP | 2004-78659 | 3/2004 |
| WO | WO 98/50889 | 11/1998 |

OTHER PUBLICATIONS

Preparata et al., "Computational Geometry," Springer-Verlag (1985), pp. 258-314.

Uesaka et al., "A New Fourier Descriptor Applicable to Open Curves," IEICE (1982), J67-A:166-173.

Kuhl et al., "Elliptic Fourier Features of a Closed Contour," Computer Graphics and Image Processing (1982), 18:236-258.

Rosenfel et al., "Digital Picture Processing," Academic Press, Inc. (1976), Chapter 8, Section 3, pp. 305-328.

Zahn et al., "Fourier Descriptors for Plane Closed Curves," IEEE Transactions on Computers (Mar. 1972). C-21:269-281.

Granlund, "Fourier Preprocessing for Hand Print Character Recognition," IEEE Transactions on Computers, (Feb. 1972), C-21:195-201.

* cited by examiner

GRAPHIC PROCESSING METHOD AND DEVICE

CROSS REFERENCE TO RELATED APPLICATION

This application is based upon and claims the benefit of priority from the prior Japanese Patent Application No. 2003-185365, filed on Jun. 27, 2003, and No. 2004-172752, filed on Jun. 10, 2004, the entire contents of which are incorporated herein by reference.

BACKGROUND OF THE INVENTION

1. Field of the Invention

The present invention relates to: a graphic processing method, device, and program recording medium; particularly a method for comparing shapes of figures; especially a shape comparison method and a shape inspection method in which outline shapes extracted from a digital image of an object acquired by a microscope or a digital image of a fine pattern acquired by an electronic microscope are compared or inspected; and further a graphic processing method including a program for realizing the method, a device, and a recording medium of a graphic processing program.

2. Background Art

There have heretofore been proposed a large number of techniques for quantizing shapes of objects reflected in general digital images acquired by digital image forming means including an electronic microscope, an optical microscope, a digital camera, a video camera and the like. Above all, as a method for judging whether or not the shape is satisfactory, a method has been frequently used in which a reference image is compared with an inspection object image, and a difference between the images is quantized to judge whether or not the shape is satisfactory.

As a quantization method, a method using a correlation function between images has been used long. The method is described in Chapter 8, Section 3, "digital Picture Processing (Academic Press, Inc. 1976)" authored by A. Rosenfel and A. C. Kak, which has already been a classic document. A function of using a value of cross correlation described in the document as a scale of similarity between the images has been incorporated as a standard into an image processing system these days, but there has been a problem that the function is largely influenced by a fluctuation of light and shade of a whole image to be treated or noise.

To solve the problem, in recent years, a method has been frequently used in which the outline of a target object included in an image is extracted, and the shape of the object is quantized or compared with a reference shape in various methods. As concrete document examples, a method in which direct template matching of numerical value data of outlines is combined with similarity transformation of a coordinate is described, for example, in U.S. Pat. Nos. 6,563,324, 5,845,007, and 5,796,868.

In these methods, it can be judged whether or not there is a difference between a reference figure and an inspection object figure, but it has been difficult to determine statistical significance concerning the difference. There has also been a problem that quantization of the difference between the figures is influenced by an error in positioning the figures.

Moreover, a method in which the outline shape is subjected to coordinate transformation to extract a characteristics amount is described, for example, in U.S. Pat. No. 3,069,654. However, there has been a problem that the method is not effective in a case other than a case where a reference figure includes circular or linear components.

Furthermore, a method in which the outline coordinate is subjected to Fourier transformation, and Fourier coefficients (Fourier descriptors) are compared to compare the shapes is described in C. T. Zahn and R. Z. Roskies: IEEE Transactions on Computers, Vol. C-21, pp 269 to 281 (1972), G. H. Granlund: IEEE Trans. Computers, C-21, pp 195 to 201 (1972), Y. Uesaka: Transaction of IEICE Vol. J67-A, pp 166 to 173 (1984), Computer Graphics and Image Processing, Vol. 18, pp 236 to 258 (1982) and the like. Application of this technique to inspection of a pattern of a semiconductor is described in Japanese Patent Application Laid-Open No. 2003-031469. In these methods, a property that scales such as Fourier descriptors are universal is used. Therefore, a reference figure can be compared with an inspection object figure without being influenced by the positioning error. On the other hand, there has been a problem that an scaling error of both the figures cannot be known.

Moreover, even when there is a difference between the obtained Fourier descriptors, it has been still difficult to determine the statistical significance. A method in which a figure prepared by simulation of design data for use in a computer aided design system (CAD), mask data prepared in preparing a photo mask in a semiconductor field, or a pattern shape obtained from the data through a pattern forming step is used as a reference figure is described in Japanese Patent Application Laid-Open Nos. 2000-293690, 2002-031525, 2001-338304 and the like.

Moreover, a method in which the Fourier descriptor of the design data or the figure prepared by the simulation is used as the reference, and compared with that of an actual pattern outline is described in the Japanese Patent Application Laid-Open No. 2000-293690. However, it is still difficult to determine the statistical significance of the difference between the figure shapes even by these methods. In the above-described methods other than the method of the Japanese Patent Application Laid-Open No. 2000-293690, it is difficult to eliminate the influence of the positioning error of both the figures. In the method of the Japanese Patent Application Laid-Open No. 2000-293690, it has been still impossible to consider the influence of the scaling error.

An object of the present invention is to provide a graphic processing method, device, and program recording medium capable of representing a difference between two figures in a method in which a significant difference can be determined, reducing an influence by a positioning error which has heretofore been a problem, and correctly considering the influence of a scaling error.

SUMMARY OF THE INVENTION

A first aspect of the present invention is directed to a graphic processing method in which a figure concerning a shape of an object is processed by an image, comprising: calculating a first figure skeleton apart from an outline of the figure by each equal distance in a central direction of the figure using at least one of a medial axis and a chordal axis with respect to a figure which represents the outline of the object shape reflected in a digital image by a set of points; removing branch lines from a vertex of the figure to the skeleton in the calculated first figure skeleton to obtain a second figure skeleton; and defining a curve coordinate system in which the second figure skeleton is one coordinate axis and a distance between the second figure skeleton and the outline of the figure is the other coordinate axis with respect to data obtained by one circulation of the outline of the figure using one end point of the second figure skeleton as a start point and using the other end point as a terminal point to transform the coordinate of points on the outline of the figure into the other coordinate axis of the curve coordinate system.

A second aspect of the present invention is directed to a graphic processing apparatus in which a figure concerning a shape of an object is processed by an image, comprising a first skeleton calculation section for calculating a first figure skeleton apart from an outline of the figure by each equal distance in a central direction of the figure using at least one of a medial axis and a chordal axis with respect to a figure which represents the outline of the object shape reflected in a digital image by a set of points; a second skeleton calculation section for removing branch lines from a vertex of the figure to the skeleton in the calculated first figure skeleton to obtain a second figure skeleton; and a coordinate transformation section for defining a curve coordinate system in which the second figure skeleton is one coordinate axis and a distance between the second figure skeleton and the outline of the figure is the other coordinate axis with respect to data obtained by one circulation of the outline of the figure using one end point of the second figure skeleton as a start point and using the other end point as a terminal point to transform the coordinate of points on the outline of the figure into the other coordinate axis of the curve coordinate system.

A third aspect of the present invention is directed to a graphic processing program recording medium for allowing a computer to process a figure concerning a shape of an object by an image, comprising a procedure for acquiring the shape of the object as digital image data to store the data in a storage section of the computer; a procedure for inputting an outline of the object shape reflected in a digital image stored in the storage section as the digital image data, and allowing a computation section of the computer to calculate a first figure skeleton apart from the outline of the figure by each equal distance in a central direction of the figure using at least one of a medial axis and a chordal axis with respect to the figure represented by a set of points; a procedure for removing branch lines from a vertex of the figure to the skeleton in the first figure skeleton calculated by the computation section, and allowing the computation section to calculate a second figure skeleton; and a procedure for defining a curve coordinate system in which the second figure skeleton is one coordinate axis and a distance between the second figure skeleton and the outline of the figure is the other coordinate axis with respect to data obtained by one circulation of the outline of the figure using one end point of the second skeleton figure as a start point and the other end point as a terminal point, and allowing a coordinate transformation section of the computer to transform the coordinate of the point on the outline of the figure into the other coordinate axis of the curve coordinate system.

DETAILED DESCRIPTION OF THE EMBODIMENTS

Embodiments of a graphic processing method, device, and program recording medium according to the present invention will be described hereinafter with reference to the accompanying drawings.

First Embodiment

First, a basic constitution of a graphic processing method according to a first embodiment of the present invention will be described. In the graphic processing method according to a basic constitution, in a first step ST1, a first figure skeleton distant from an outline of a figure by each equal distance toward a center of the figure is calculated using at least one of a medial axis and a chordal axis with respect to the figure in which the outline of an object shape reflected in a digital image is represented by a set of points. Next, in a second step ST2, a branch line extending to the skeleton from a vertex of the figure is deleted from the first figure skeleton calculated by the first step ST1 to obtain a second figure skeleton. Next, in a third step ST3, with respect to data obtained by one circulation of the outline of the figure using one end point of the second figure skeleton obtained by the second step as a start point and using the other end point as a terminal point, a curve coordinate system is defined using the second figure skeleton as one coordinate axis and using a distance to the outline of the figure from the second figure skeleton as the other coordinate axis to transform the coordinate of the point on the outline of the figure into the other coordinate axis of the curve coordinate system. The figure concerning the shape of the object is processed by the first to third steps ST1 to ST3.

Next, a concrete constitution of the graphic processing method according to the first embodiment of the present invention will be described in accordance with an example of a pattern figure included in design data of a semiconductor fine pattern and an inspection object graphic processing method. First, the pattern figure corresponding to a pattern which is an inspection object is selected from design CAD data, and recorded as polygon data in a storage section 106 in an inspection apparatus of a fine pattern described later with reference to FIG. 19. A graph of a curve coordinate system obtained by processing shown in FIGS. 2(a) to 2(e) is shown in FIG. 3.

Figure 2:
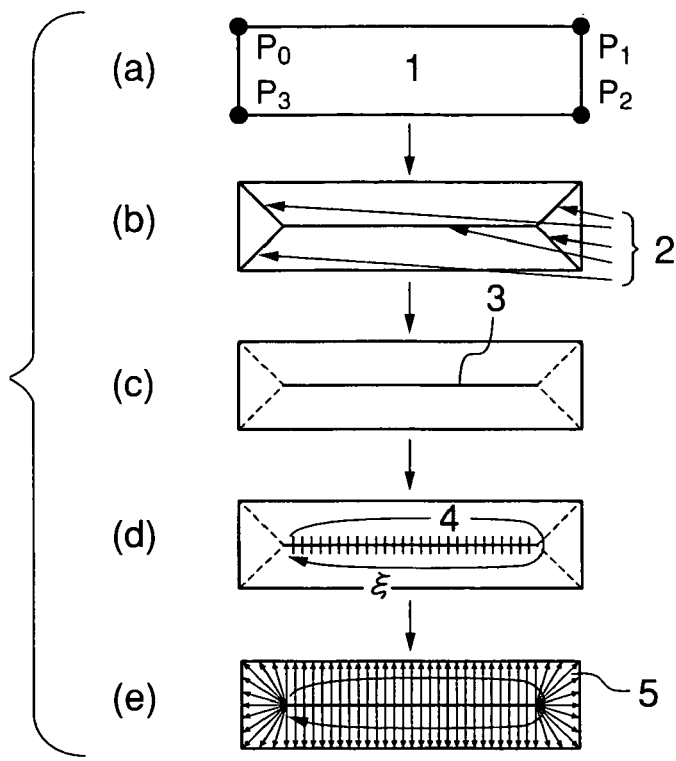
FIGS. 2($a$) to 2($e$) are explanatory views showing processing steps of the graphic processing method according to the first embodiment of the present invention.
Figure 3:
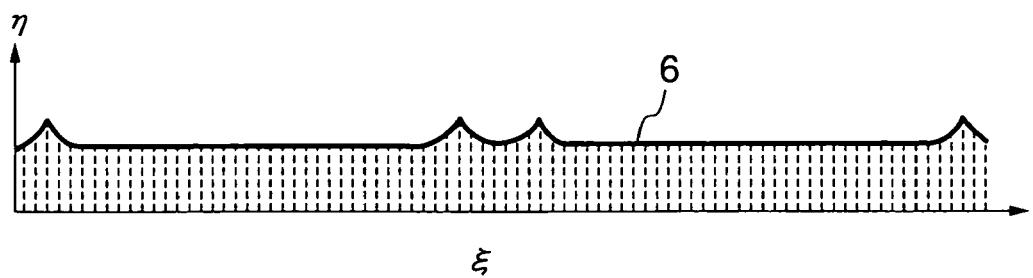
FIG. 3 is an explanatory view showing a rectangular shape represented by a graph according to the first embodiment.

This figure has a shape shown in FIG. 2(a), and vertex coordinate Pi (i=0;1;2;3) is given as numerical value data. Next, the skeleton of the figure referred to as a medial axis is prepared with respect to the figure. Here, the medial axis is a type of the skeleton of the figure proposed by H. Blum in 1967. This is a polygonal line constituted of a set of centers of circles (referred to as maximal disks) which are inside the figure and which contact the side of the figure by at least two points, and is formed by connecting a midline of two sides holding each vertex to that of facing sides as shown by lines 2 shown in FIG. 2(b) with respect to a rectangular shape 1 shown in FIG. 2(a).

Figure 4:
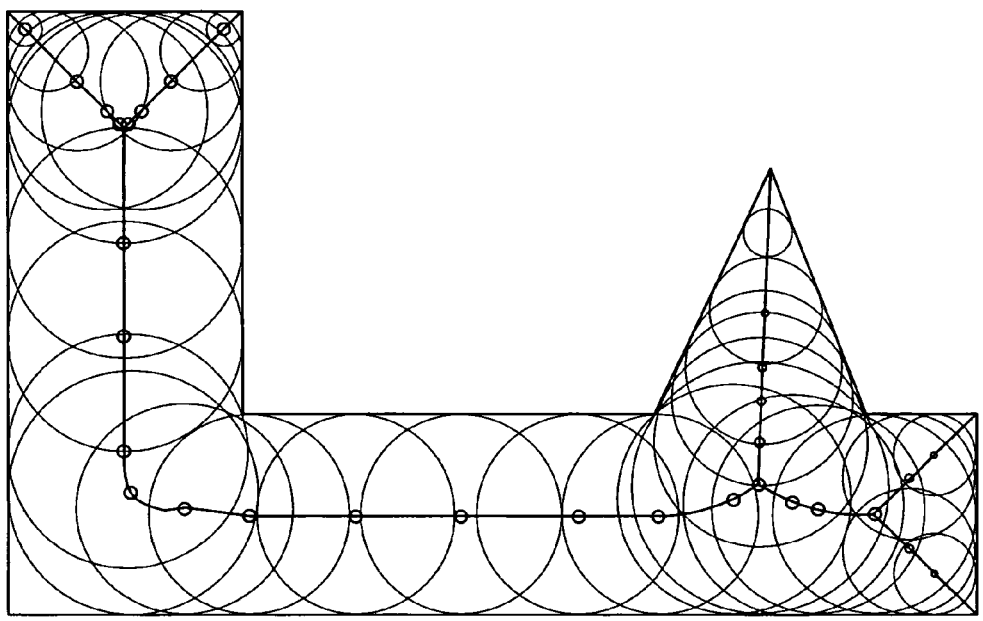
FIG. 4 is an explanatory view showing definition of a medial axis for use in the embodiment of the present invention.

Here, definition of the medial axis will be described with reference to FIG. 4. As shown in FIG. 4, the medial axis refers to a line formed by connecting centers of inscribed circles of the figure, and is also a part of Voronoi diagram with respect to all the sides constituting the figure.

It is to be noted that in the first embodiment, the medial axis is used as the skeleton of the figure, but this may also be substituted by another skeleton referred to as a chordal axis. The chordal axis is defined in a method of forming the figure in skeletons, described in document "L. Prasad, CNLS Newsletter 139: July 1997, pp 1 to 18". Concretely, a chord having a maximum length (hereinafter referred to as the maximal chord of tangency is selected from at least one chord connecting the maximal disk to a point contacting an object figure, and midpoints are connected to each other to constitute the chordal axis.

Figure 5:
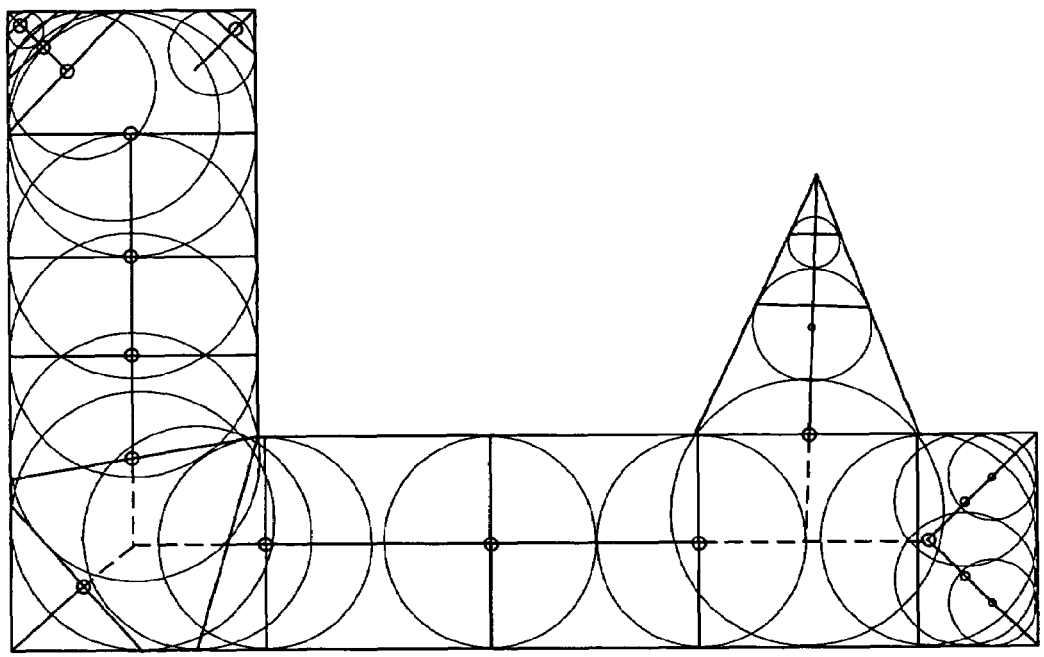
FIG. 5 is an explanatory view showing definition of a chordal axis for use in the embodiment of the present invention.

A curve coordinate is constituted from the skeleton (first figure skeleton) by analogy of a flow field using the medial coordinate and chordal axis shown in FIGS. 4 and 5. A flow line with respect to a source of current of a parabola is a set of parabolas crossing the parabola at right angles. A principle of superposition is established in the flow field. Furthermore, the medial axis of the CAD figure is constituted of a line segment and a parabola, and therefore can be calculated by the superposition.

Next, as shown in FIG. 2(c), a line of a portion of the skeleton passing through the vertex is deleted. This is referred to as "the pruned skeleton (second figure skeleton)".

By the application of the above-described drawing rule, a unique skeleton can be drawn with respect to any rectangular shape.

Next, one end of a pruned skeleton 3 is used as a start point, a new coordinate is defined on a line in a direction for circulating a periphery of the skeleton once, and this coordinate is used as one coordinate axis xi ($\xi$) of a curve coordinate system as show by reference numeral 4 in FIG. 2(d). Moreover, a distance to the outline of the figure from the pruned skeleton 3 is checked with respect to each value of the coordinate axis $\xi$ to obtain the other coordinate axis eta ($\eta$). Additionally, as shown in FIG. 2(e), the coordinate axis $\eta$ is measured radially from the end point of the pruned skeleton (second figure skeleton).

By the above-described procedure, the rectangular shape 1 originally represented by Descartes coordinate system is represented as a curve on the newly defined curve coordinate system "$\xi$-$\eta$" by a line 6 as shown in FIG. 3. This is an embodiment of a new graphic processing method according to the basic constitution of the present invention. A graph shown in FIG. 3 is obtained by drawing points constituting the figure, assuming that one coordinate axis corresponding to the skeleton of the original figure is a horizontal axis, and the other coordinate axis which does not correspond to the chordal axis of the original figure is a vertical axis.

Figure 6:
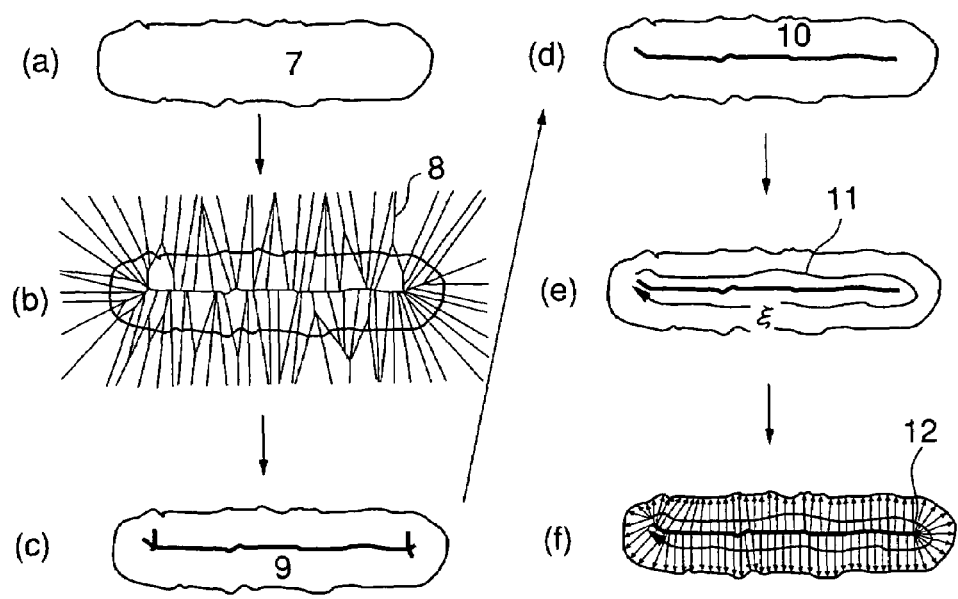
FIGS. 6($a$) to 6($f$) are explanatory views showing a constituting method of a pattern outline, medial axis, and curve coordinate used in the first embodiment.

Next, to obtain an inspection object figure, first an image of a pattern constituting an inspection object is acquired by an electronic microscope to extract outline data as shown in FIG. 6(a). As a method of extracting the outline data from the electronic microscope image, a method described in claim 1 of Japanese Patent Application Laid-Open No. 2003-16463 is used. However, another method, for example, an edge extraction method using Sobel filter, Canny filter, Deliche filter or the like may also be used. After subtractive mixture to a binary or tertiary image, a boundary between regions having different gradations may also be defined as an edge. Furthermore, a method combined with thinning, tree pruning, noise removing, and expansion/contraction may also be used.

Figure 7:
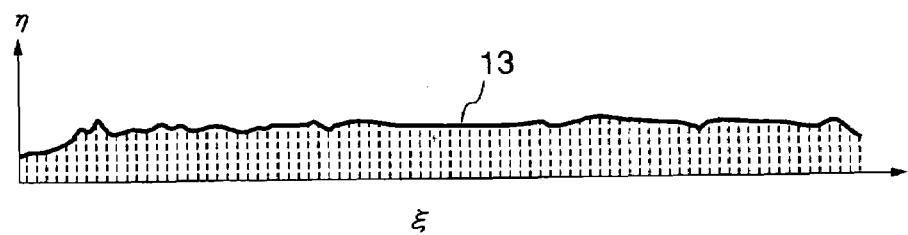
FIG. 7 is an explanatory view showing a pattern figure represented by a graph according to the first embodiment.

Next, a Voronoi diagram 8 with respect to points constituting a FIG. 7 shown in FIG. 6(a) is drawn as shown in FIG. 6(b). Subsequently, only sides of the Voronoi diagram 8 which do not intersect with an outline of the FIG. 7 are left, and the other sides are deleted from the sides of the Voronoi diagram to obtain a polygonal line 9 as shown in FIG. 6(c). This is a medial axis with respect to the general figure. Subsequently, branches of the medial axis are removed to obtain a polygonal line 10 as shown in FIG. 6(d).

Subsequently, as shown in FIG. 6(e), one axis $\xi$ of the curve coordinate is produced in accordance with a path 11 which detours around the polygonal line 10. Subsequently, as shown in FIG. 6(f), a distance extending toward the original figure from $\xi$ is measured, and a length is assumed as $\eta$.

By the above-described processing steps, the FIG. 7 originally represented by the Descartes coordinate system is represented as a curve on the newly defined curve coordinate system $\xi$-$\eta$ as shown by a line 13 in FIG. 7. This relates to a new graphic processing method in which the skeleton of the figure is formed using a part of the Voronoi diagram of the points constituting the figure. A graph shown in FIG. 7 is obtained by drawing the points constituting the figure, assuming that one coordinate axis corresponding to the skeleton of the original figure is a horizontal axis, and the other coordinate axis which does not correspond to the skeleton of the original figure is a vertical axis. By this graph, the points constituting the figure are obtained from those representing the figure. It is to be noted that even in this case, the chordal axis may also be used instead of the medial axis.

Second Embodiment

Next, a graphic processing method according to a second embodiment of the present invention will be described. In the second embodiment, comparison of a CAD figure with an outline figure of a pattern extracted from a SEM image will be described. First, a pattern figure corresponding to a pattern constituting an inspection object is selected from design CAD data, and recorded as polygon data in the storage section 106 of FIG. 19 described later. This figure has a shape shown by a FIG. 14 in FIG. 8(*a*).

Figure 8:
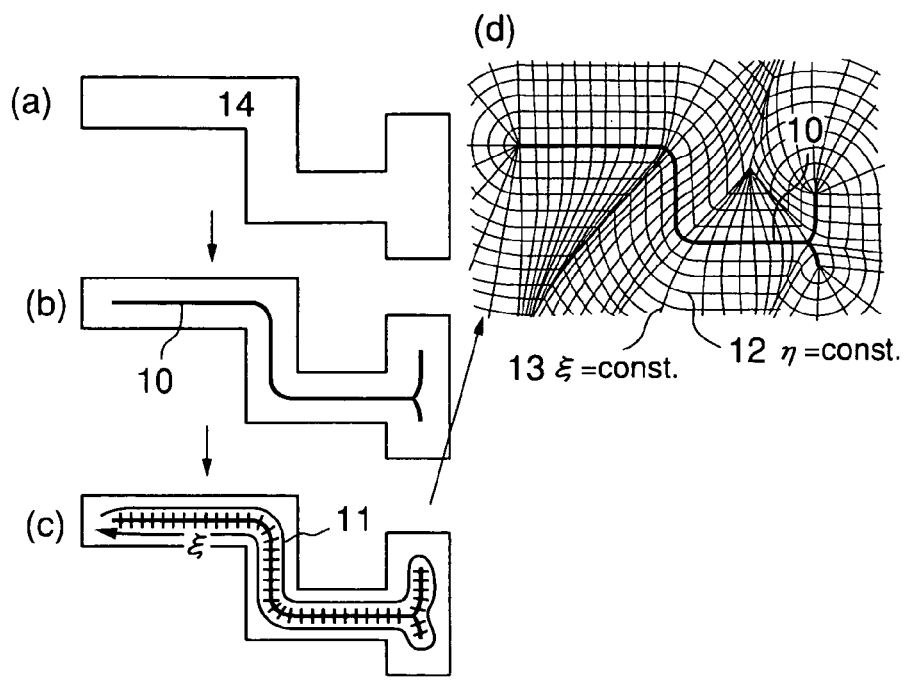
FIGS. 8($a$) to 8($d$) are explanatory views showing a constituting method of a CAD figure, medial axis, and curve coordinate in a second embodiment of the present invention.

Subsequently, a medial axis is prepared with respect to this figure, and branches are pruned off from the figure as shown in FIG. 8(*b*). Next, one end of a skeleton 10 is used as a start point, and a new coordinate is defined as a coordinate axis ξ on a line in a direction of one circulation around the skeleton (11 of FIG. 8(*c*)). Subsequently, a curve group 13 conjugated with curve groups 12 and 13 at an equal distance from the coordinate axis ξ is calculated to prepare a new coordinate system by ξ-η (FIG. 8(*d*)).

In the above-described η, for example, an end portion 19 of the skeleton is assumed as an original point of ξ-η with respect to the curve group 12 at the equal distance from ξ, each point on which a horizontal line drawn toward the left side from the original point intersects with each curve is regarded as a start point of each curve to divide all the curves belonging to the curve group 12 by an equal number, corresponding dividing points are smoothly connected to each other, and accordingly η can be constituted. As a method in which a new coordinate system ξ-η is prepared from the skeleton, the following method can be further constituted. That is, a complex plane indicating a two-dimensional ideal fluid system with respect to an x-y coordinate is regarded, and the skeleton 10 drawn on the plane is regarded as a port of a source of fluid.

Then, a complex velocity potential Φ+iΨ is determined with respect to the fluid system, and psi (Ψ) is a velocity potential, and can be represented by a contour line whose ξ axis is regarded as a ridge line. Ψ is a function of flow, and determines a direction of a flow line. Therefore, when the contour line of phi (Φ) is indicated in an xi coordinate, and that of Ψ is indicated in an η coordinate, a curve coordinate similar to FIG. 8(*d*) can be constituted.

Figure 9:
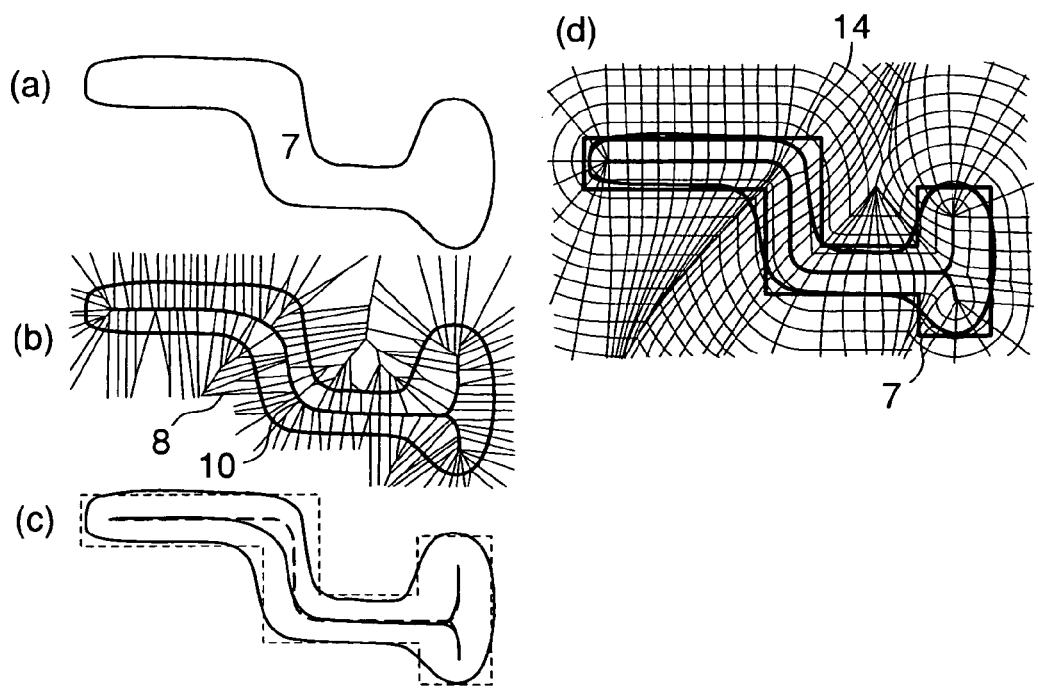
FIGS. 9($a$) to 9($d$) are explanatory views of the pattern outline and medial axis in the second embodiment, and also show the pattern outline superposed upon the result of FIG. 8 in such a manner that medial axes match each other.

Next, to obtain the inspection object figure, first an image of a pattern constituting an inspection object is acquired by an electronic microscope, and outline data is extracted as shown in FIG. 9(*a*). As a method of extracting the outline data from the electronic microscope image, a method described in claim 1 of Japanese Patent Application Laid-Open No. 2003-16463 is used. However, another method, for example, an edge extraction method using Sobel filter, Canny filter, Deliche filter or the like may also be used. After subtractive mixture to a binary or tertiary image, a boundary between regions having different gradations may also be defined as an edge. Furthermore, a method combined with thinning, tree pruning, noise removing, and expansion/contraction may also be used.

Next, as shown in FIG. 9(*b*), a Voronoi diagram 10 is drawn with respect to the points constituting the FIG. 7.

Subsequently, the skeleton is prepared by a step similar to that of the first embodiment, and a reference figure is moved as shown in FIG. 9(*c*) in order to most match a position of the skeleton of the reference figure obtained in FIG. 8. Accordingly, as shown in FIG. 9(*d*), both figures are represented on the same curve coordinate.

Figure 10:
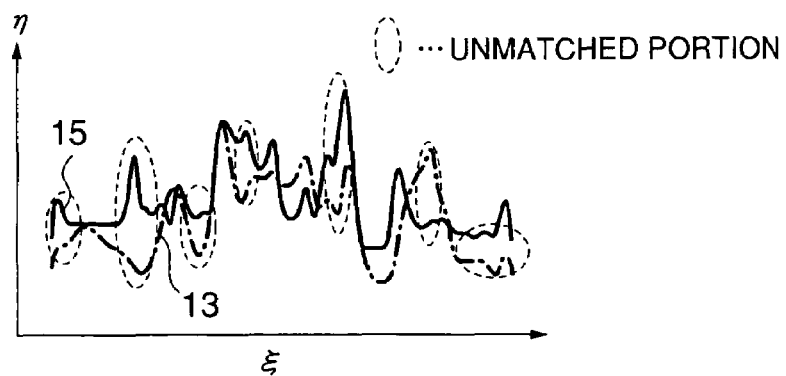
FIG. 10 is an explanatory view showing the CAD figure and pattern outline represented by the curve coordinate in the second embodiment.
Figure 13:
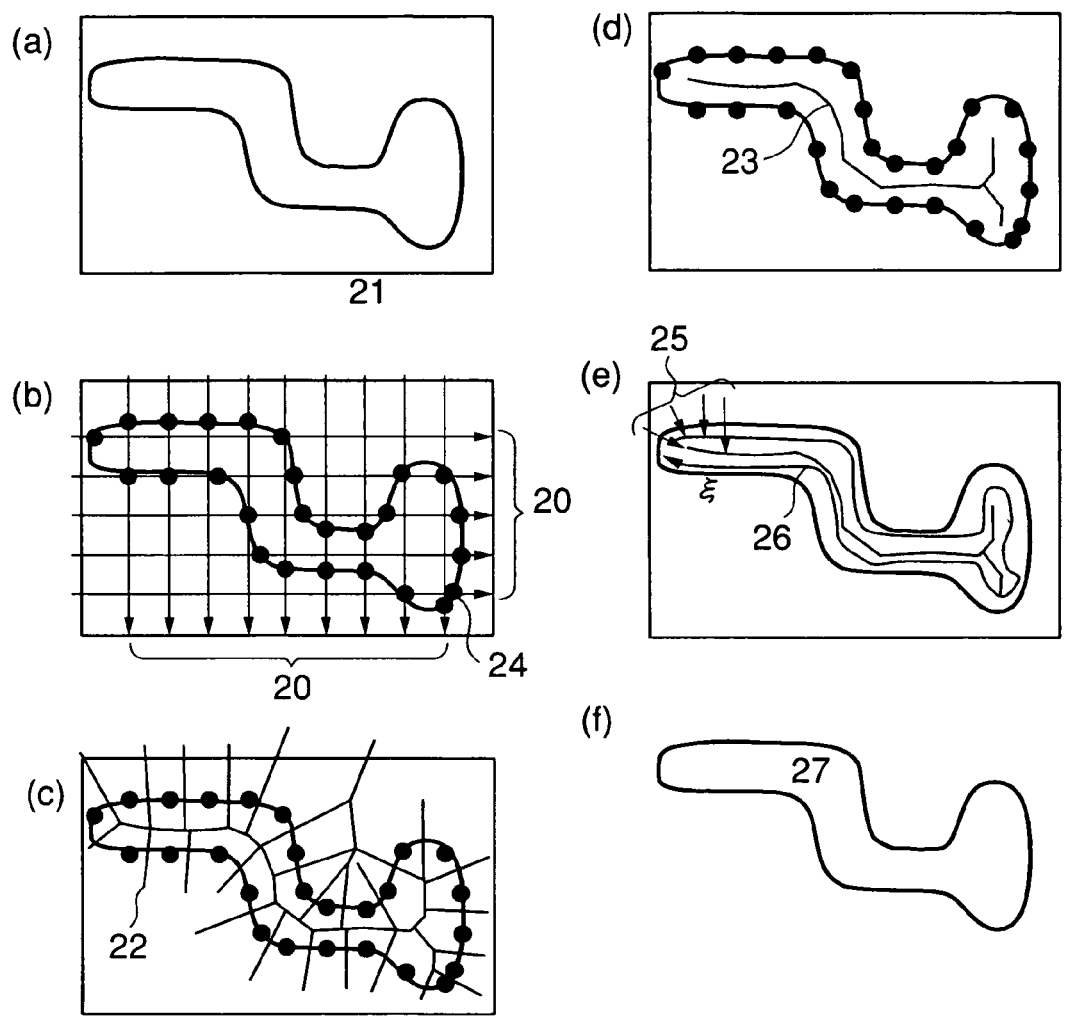
FIGS. 13($a$) to 13($f$) are explanatory views showing the graphic processing method according to a fifth embodiment of the present invention.
Figure 15:
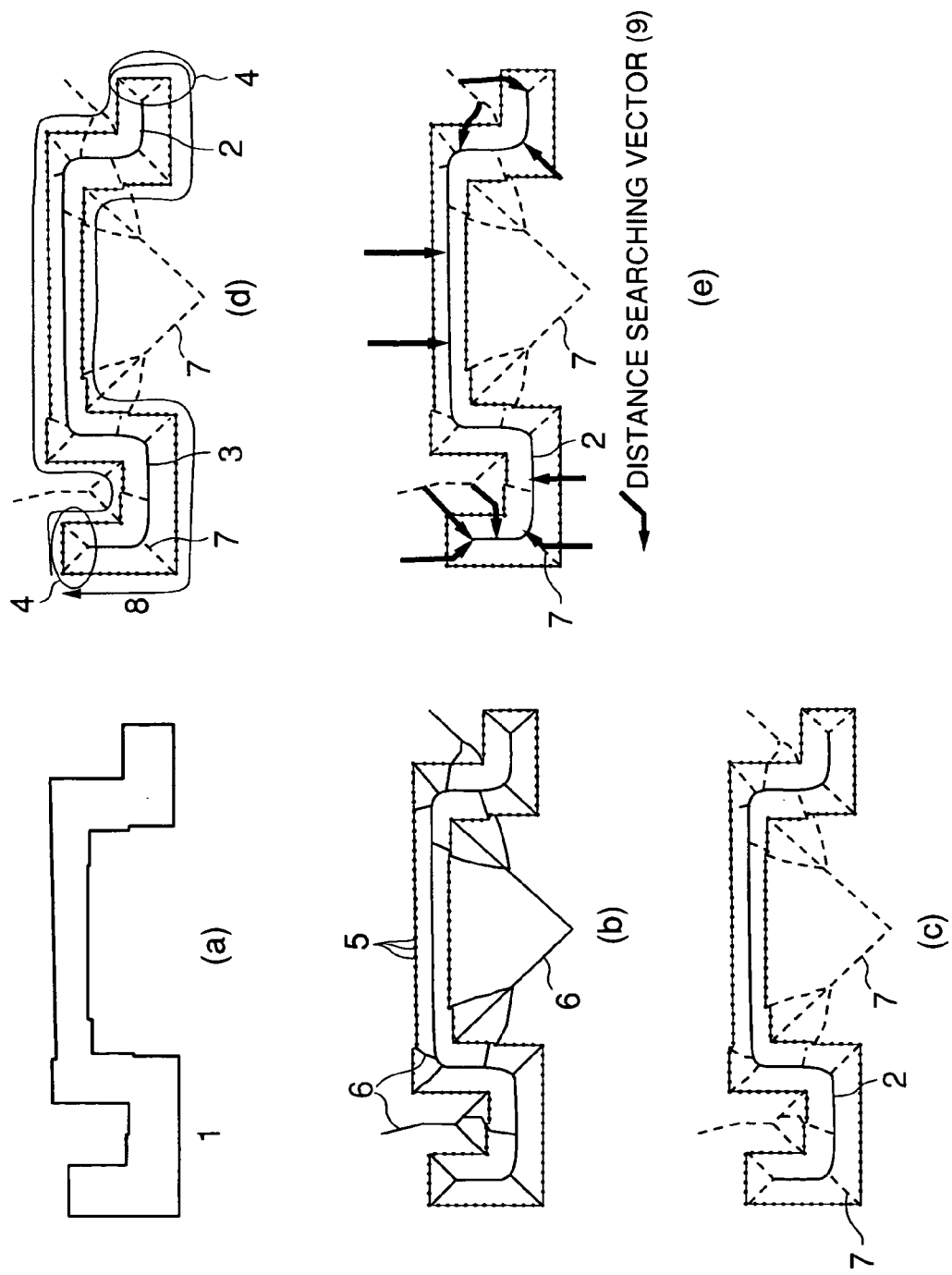
FIGS. 15($a$) to 15($e$) are explanatory views of a method of constituting a distance search direction of a sixth embodiment.

FIG. 10 shows a reference FIG. 15 and an inspection object FIG. 13 represented by the ξ-η coordinate system. Unmatched portions of both the figures are known instantly from the drawing. As a result of the positions by the original figure, it is seen that the unmatched portion corresponds to a broken figure portion or a figure corner portion.

Third Embodiment

Figure 11:
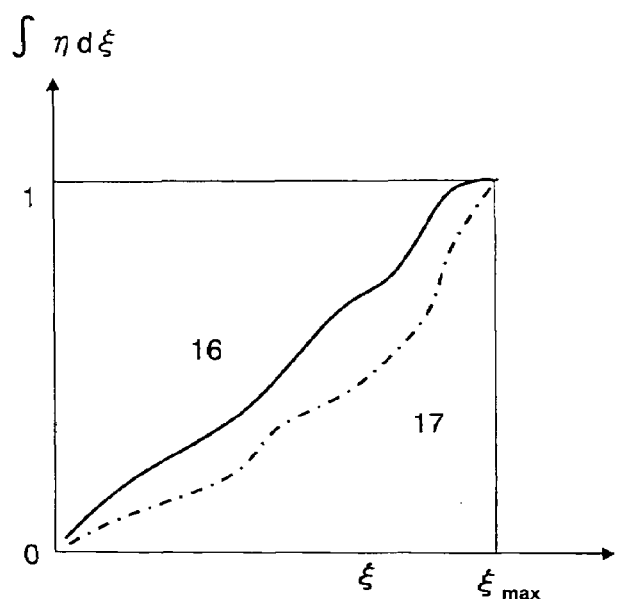
FIG. 11 is a graph indicating an amount of integration of the respective figures shown in FIG. 10 along $\epsilon$ coordinate.

Next, a graphic processing method according to a third embodiment of the present invention will be described. In the third embodiment, a method of evaluation of agreement between two figures will be described. Values obtained by integrating both curves in the ξ-η coordinate system obtained in the second embodiment along ξ are plotted in the ordinate, and ξ is plotted in the abscissa as shown in FIG. 11. Since a maximum value of a difference between the values of both curves normalized as ∫ηdξ=1 in the corresponding ξ coordinate corresponds to Kolmogorov-Smirnov statistic, the values are compared with a numerical table to calculate the agreement between the curves.

Fourth Embodiment

Figure 12:
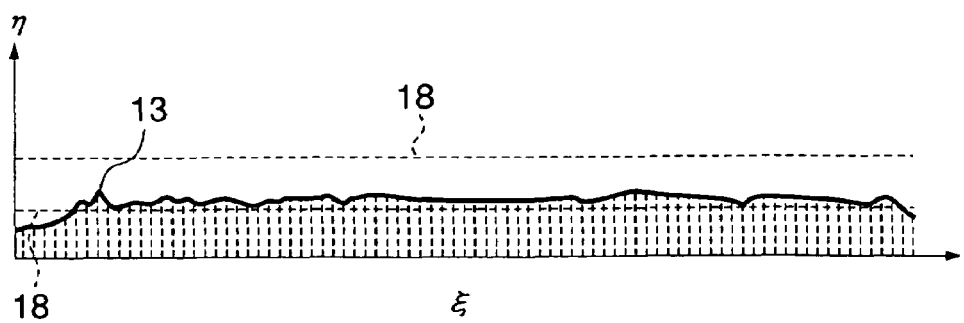
FIG. 12 is an explanatory view showing the graphic processing method according to a fourth embodiment of the present invention.

Next, a graphic processing method according to a fourth embodiment of the present invention will be described. The fourth embodiment is an example of a case where a tolerance of deformation is given, and an inspection object figure is coordinate-transformed in the same manner as in the first embodiment. Ranges 18 of shapes tolerated with respect to the figure are superposed as shown in FIG. 12, and it is seen that opposite ends of the graph are below a lower limit. This indicates that the end of the pattern is formed to be further shorter than a tolerated value.

Therefore, it is seen that the inspection object figure is deformed to a non-tolerable degree. To perform the inspection in the Descartes coordinate system, it needs to be evaluated whether or not the inspection object pattern intersects with a figure indicating upper and lower limits of the tolerance. For this evaluation, the intersecting needs to be judged with respect to all the sides of both the figures. Assuming that the number of sides of one figure is N, and that of sides of the other figure is M, a calculation complexity determined by the number of intersecting judgments is O(N×M) in a simple algorithm. Even when an optimum algorithm is used, O(NlogN) (N to M) results. There is a problem that much calculation time is required for obtaining judgment results.

According to the method of the fourth embodiment, once graphic data is supplied in the coordinate system based on a skeleton, only sizes of η coordinates in corresponding ξ coordinates of both figures need to be checked, that is, O(N+M) results. Additionally, when only deviation from the tolerance is checked, and both shapes do not have to be compared for differences, the existing intersecting judgment algorithm is preferably used with respect to a combination of optional sizes of each figure in the graphic data represented by the original Descartes coordinate system. A more preferable algorithm is an intersecting judgment algorithm using a scanning line status, described in Chapter 7 of document "Computational Geometry—An Introduction" (Springer-Verlag, 1985) by "F. P. Preparata and M. I. Shamos".

Fifth Embodiment

Next, a graphic processing method according to a fifth embodiment of the present invention will be described. The fifth embodiment relates to an extraction method of a figure outline substantially along the coordinate system based on a figure skeleton. In the present embodiment, a part of an image processing method described in claim 8 of Japanese Patent Application No. 2002-239194 was used. That is, first an image 21 which is an object of outline extraction is acquired by SEM as shown in FIG. 13(*a*).

Subsequently, as shown in FIG. 13(*b*), a schematic pattern edge is searched along directions shown by arrows 20 with respect to the image. Here, simple peak searching is performed, and a point 24 identified as a peak is regarded as the edge.

Subsequently, as shown in FIG. 13(*c*), a Voronoi diagram 22 is prepared using the point 24 obtained in the above-described step as a generatrix.

Subsequently, the extracting of the edges is tried again along each side of the Voronoi diagram 22. When the edge is found, as shown in FIG. 13(*d*), the edge and the continuing edge are erased to a branch point. These steps form a part of the image processing method described in claim 8 of Japanese Patent Application No. 2002-239194.

A side 23 of FIG. 13(*d*) left without being erased is substantially the same as the pruned medial axis of the pattern outline. Therefore, this side is defined as $\xi$ axis, the $\xi$-$\eta$ coordinate system is constructed in the same manner as in the second embodiment, and the pattern edges are searched along directions 25 along the $\eta$ axis in order shown by an arrow 26. Concretely, luminance is set to 50% of maximum-minimum width with respect to a line profile in which luminance data of the image is acquired as one-dimensional arrangement in the directions of arrows 25. In this manner, as shown in FIG. 13(*f*), ordered pattern outline data 27 can be obtained.

Sixth Embodiment

Figure 14:
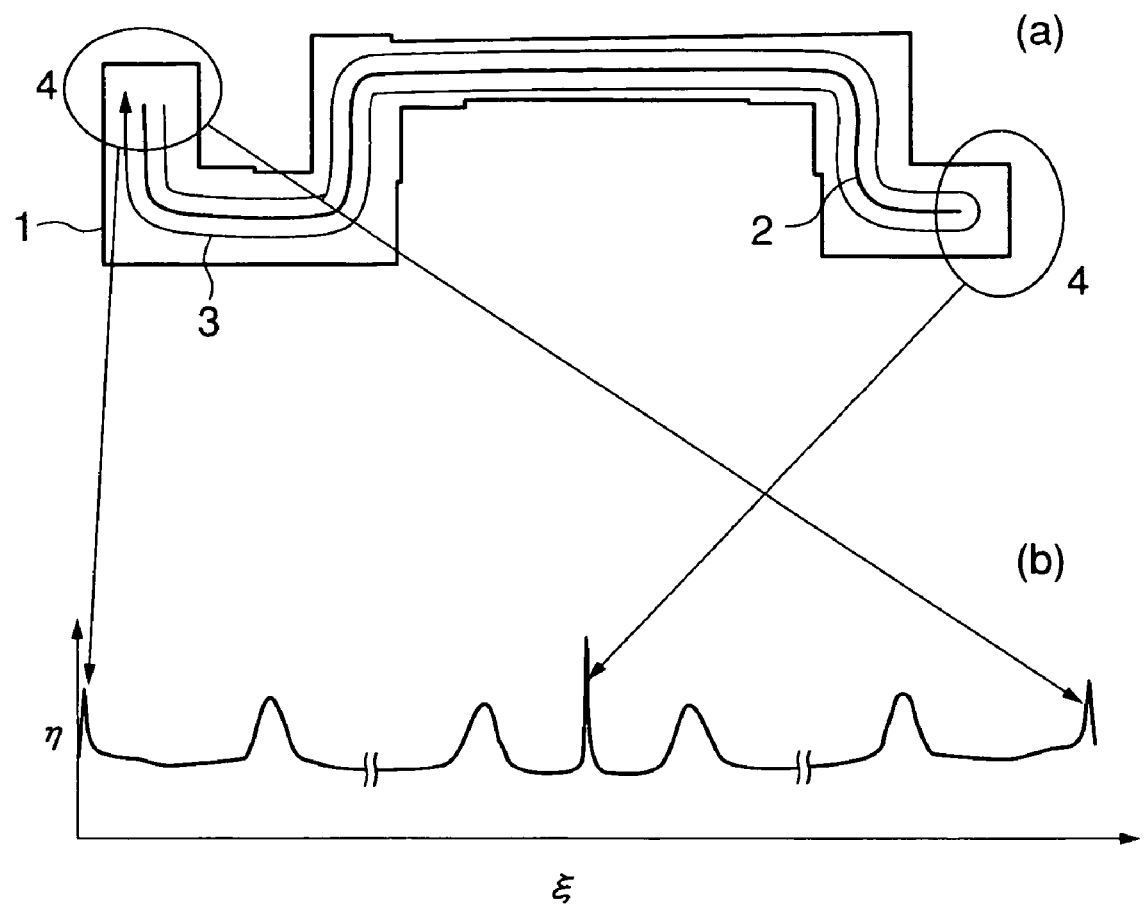
FIG. 14 is an explanatory view showing a disadvantage generated in an end point of a second figure skeleton.

In the graphic processing methods according to the first to fifth embodiments, a method is proposed in which a curve coordinate is defined using a medial axis of a figure as a reference, and a figure is compared with another figure by a coordinate system. However, in the methods of the first to fifth embodiments, to circulate inside the pattern along the medial axis, as shown in FIG. 14, data points are concentrated on end points of a second figure skeleton (medial axis). Therefore, the method was not effective in comparing differences of end portions of figure patterns. Then, in the sixth embodiment, in consideration of these problems, there is provided a method in which differences between two figures are represented by a method capable of testing a significant difference. There is also provided a method capable of reducing influences of positioning errors, which have been problems of related arts, and correctly considering influences of scaling errors.

In the sixth embodiment, a method in which a pattern figure included in design data of a semiconductor fine pattern and an inspection object figure are represented will be described as an example. First, the pattern figure corresponding to the pattern constituting the inspection object is selected from design CAD data, and recorded as polygon data in a storage section 106 in FIG. 19 described later. This figure has a shape 1 shown in FIG. 15(*a*), and vertex coordinate Pi (i=0;1;2;3) is given as numerical value data.

Figure 1:
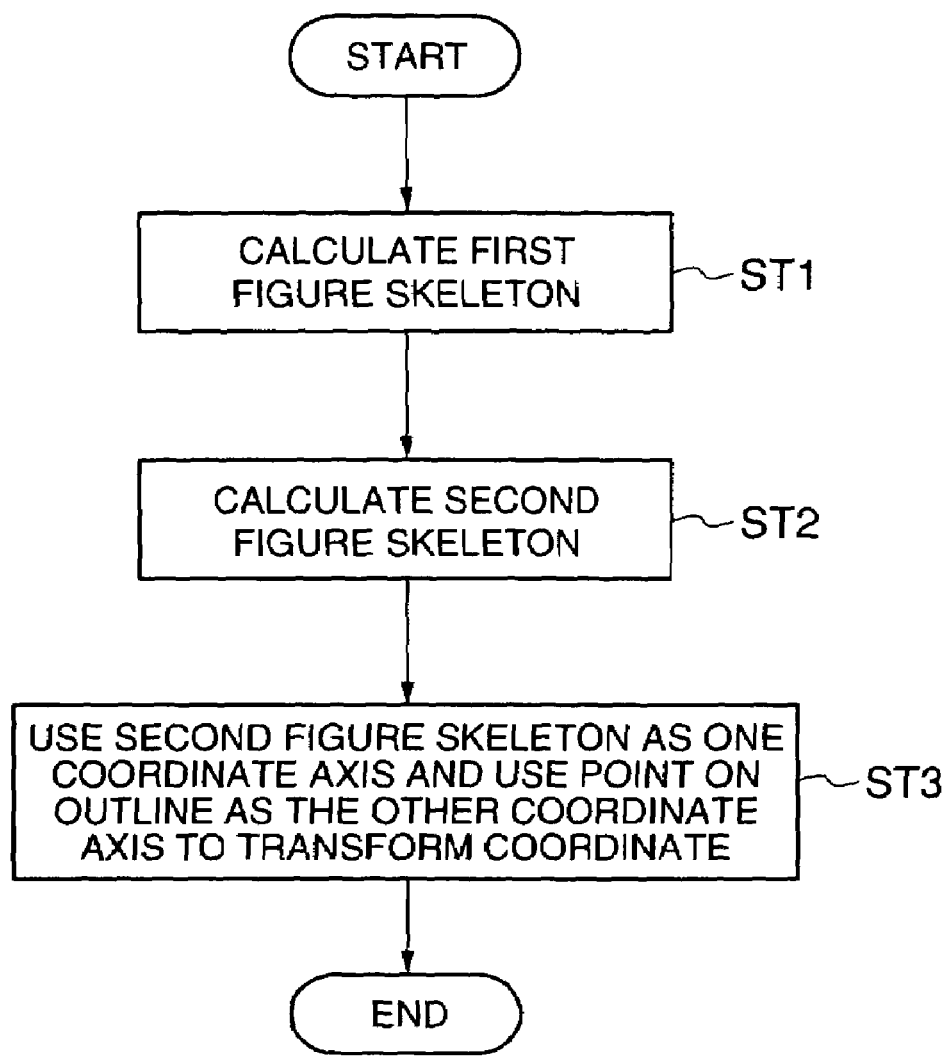
FIG. 1 is a processing flowchart of a graphic processing method according to a first embodiment of the present invention.

Next, the outline of the FIG. 1 is equally divided into micro lengths, the Voronoi diagram is drawn with respect to dividing points 5, and the sides of the Voronoi diagram which intersect with the outline of the pattern are removed to prepare the skeleton of the figure referred to as a medial axis (first figure skeleton) as shown in FIG. 15(*b*). In this case, the skeleton is also prepared outside the figure. It is to be noted that, in the sixth embodiment, the medial axis is used as the skeleton of the figure, but the present invention is not limited to this embodiment, and another skeleton by a different technique called a chordal axis may also be used instead of the medial axis. The medial axis and chordal axis have been described in detail in the first embodiment with reference to FIGS. 4 and 5.

Subsequently, the line of the portion passing through the vertex of the first figure skeleton and the skeleton outside the figure are removed to prepare a second figure skeleton called "pruned skeleton" as shown in FIG. 15(*c*). By the application of the above-described drawing rule, a unique skeleton can be drawn with respect to any figure. Additionally, since positions of removed branches are used in a distance searching procedure described later, the information is left on a memory.

Next, a new coordinate is defined by the micro divided points on the outline in a direction of one circulation on the outline, and obtained as $\xi$ axis as shown in FIG. 15(*d*). Moreover, a distance to the outline of the FIG. 1 from the pruned skeleton 3 is checked with respect to each value of the coordinate axis $\xi$ to obtain this distance as the coordinate axis $\eta$ as shown in FIG. 15(*e*). Additionally, instead of simply measuring a shortest distance, the distance to the outline of the figure from the second figure skeleton is measured along a distance searching vector constituted as follows. At this time, positional data of removed branches stored in the memory is used as the distance searching vector.

That is, first the distance searching vector directed toward the medial axis is prepared in a direction crossing the schematic pattern outline at right angles from the dividing points 5 which have divided the pattern outline. When the vector crosses the medial axis before the pruning, the direction of the vector is changed to a direction extending along the medial axis. Moreover, when the pruned medial axis crosses the vector, the distance searching is ended, and a total sum of lengths of vectors connecting the points on the pattern outline to the medial axis is obtained as a distance $\eta$.

Figure 16:
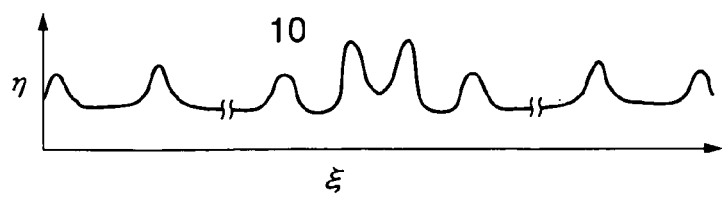
FIG. 16 is a diagram showing an outline of a reference figure represented by a graph according to the sixth embodiment.

By the above-described procedure, the FIG. 1 originally represented by the Descartes coordinate system is represented as a curve on a newly defined curve coordinate system $\xi$-$\eta$ as shown by a graph 10 of FIG. 16. This relates to a new graphic representing method described in claim 13.

Figure 17:
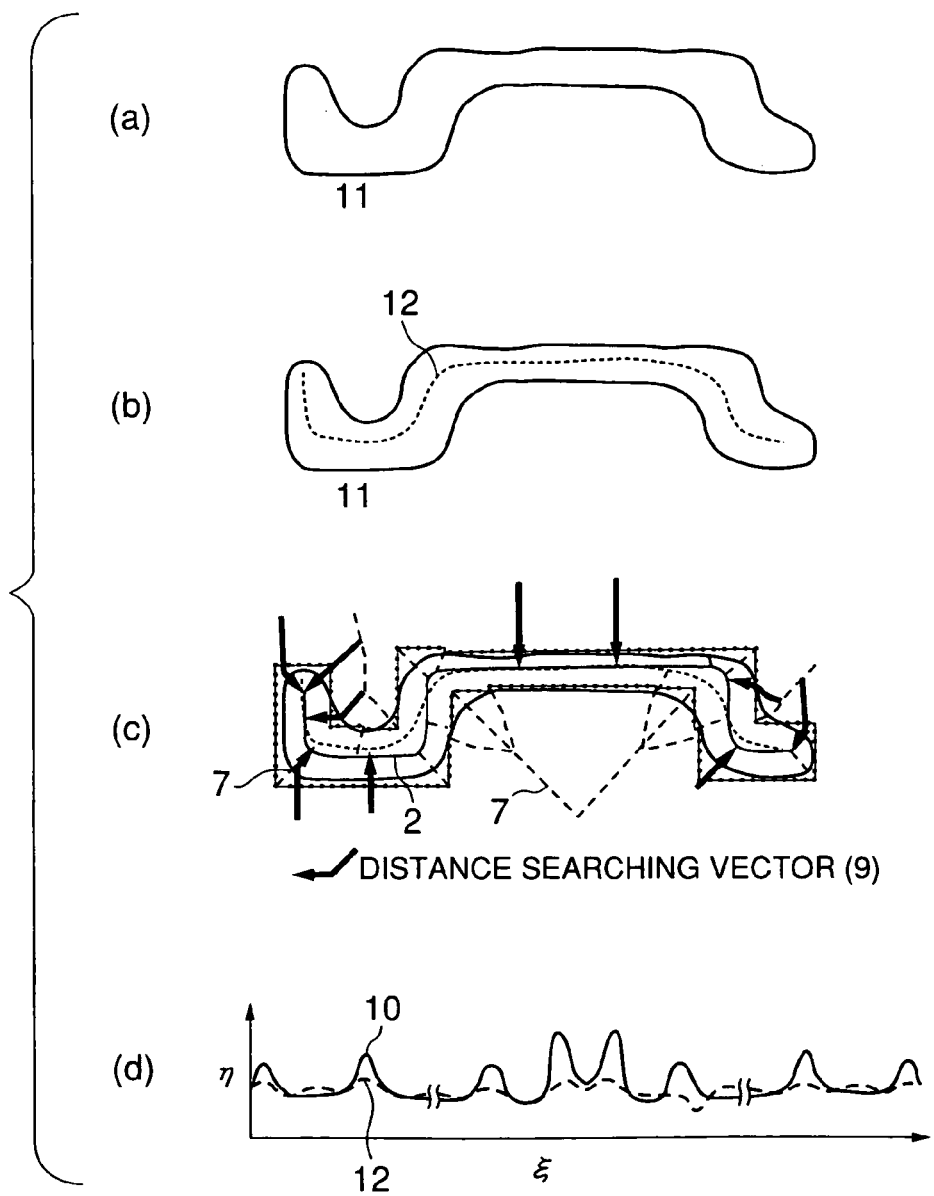
FIGS. 17($a$) to 17($d$) are diagrams showing a constituting method of the distance search direction of the pattern outline used in the sixth embodiment, and an outline of the inspection object figure represented by a graph by the method.

Next, to obtain the inspection object figure, first the pattern image constituting the inspection object is acquired by an electronic microscope to extract outline data of a pattern data shown in FIG. 17(*a*). As a method of extracting the outline data from the electronic microscope image, a method described in claim 1 of Japanese Patent Application Laid-Open No. 2003-16463 is used. However, another method, for example, an edge extraction method using Sobel filter, Canny filter, Deliche filter or the like may also be used. After subtractive mixture to a binary or tertiary image, a boundary between regions having different gradations may also be defined as an edge. Furthermore, a method combined with thinning, tree pruning, noise removing, and expansion/contraction may also be used.

Next, a Voronoi diagram with respect to points constituting a FIG. 11 is drawn. Thereafter, only sides of the Voronoi diagram which do not cross an outline of the FIG. 11 are left, and the other sides are deleted to obtain the medial axis with respect to the figure to obtain a skeleton (first figure skeleton) 12 with respect to the figure as shown in FIG. 17(*b*). Subsequently, the reference figure is moved in such a manner that the skeleton of the figure obtained in FIG. 17(*a*) most matches another skeleton.

Moreover, as shown in FIG. 17(c), distances to the pruned medial axis of the reference figure from the outline of the inspection object figure are successively calculated by distance searching vectors 7 constituted from the reference FIG. 1. By the above-described procedure, $\xi$-$\eta$ of the inspection object figure is obtained, and the inspection object figure is represented on the same curve coordinate as that of the reference figure as shown in FIG. 17(d). Mutual unmatched places in the reference figure and the inspection object figure are known instantly from FIG. 17(d). As a result of the positions by the original figure, it is seen that the unmatched portion corresponds to a broken figure portion or a figure corner portion.

In the sixth embodiment, a direction crossing the outline of the original reference figure substantially at right angles during preparation of the distance searching vector is determined as an initial direction, but various changes are possible. For example, preprocessing may also be performed in which the corner portion of the reference figure is cut/drawn at a certain standard, and all corners are formed in obtuse angles. Alternatively, after preparing a smooth reconstituted curve using a low-dimensional Fourier descriptor with respect to the reference figure, a direction crossing the curve at right angles may also be obtained as the initial direction of the distance searching vector. By the preprocessing, it is possible to well avoid disadvantages that the distance searching vector of the corner portion of the pattern intersects or overlaps.

In the present embodiment, the reference figure is superposed upon the inspection object image in such a manner that the skeletons most match each other, but the present invention is not limited to this embodiment, and various changes are possible. For example, there are also methods in which the figures are superposed upon each other in such a manner that gravity positions of both images match each other or the outlines most match each other.

Seventh Embodiment

Figure 18:
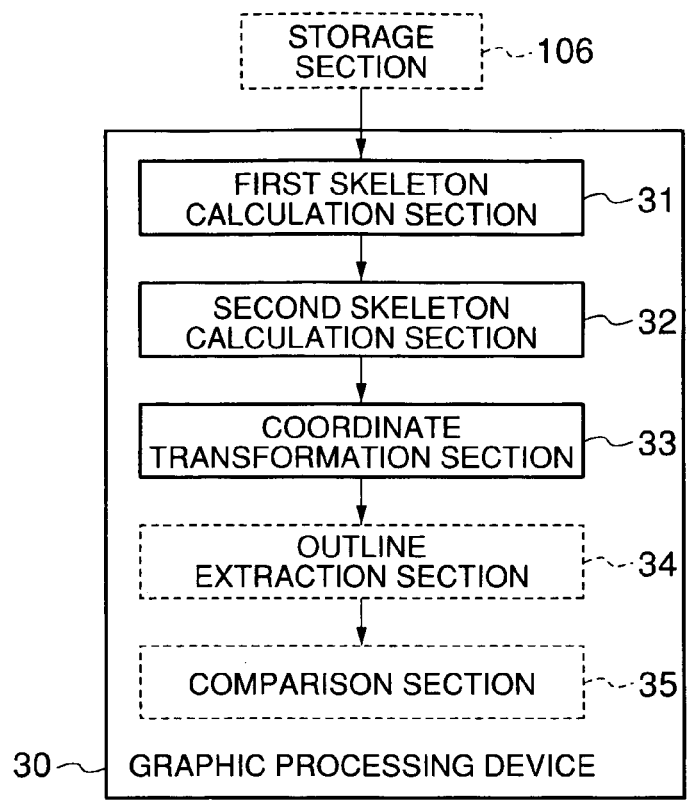
FIG. 18 is a block diagram showing a function constitution of a graphic processing device according to a seventh embodiment of the present invention.

Next, a constitution of a graphic processing device according to a seventh embodiment of the present invention will be described with reference to FIG. 18. In FIG. 18, a graphic processing device 30 basically includes: a first skeleton calculation section 31 which calculates a first figure skeleton based on digital image data supplied from a storage section 106; a second skeleton calculation section 32 which obtains a second skeleton figure; and a coordinate transformation section 33 which transforms a coordinate into a curve coordinate system in which the second skeleton figure is one coordinate axis and a distance between the second skeleton figure and the outline is the other coordinate axis.

In the graphic processing device 30 shown in FIG. 18, the first skeleton calculation section 31 calculates the first figure skeleton apart from the outline of the figure by each equal distance in a central direction of the figure using at least one of a medial axis and a chordal axis with respect to the figure in which the outline of an object shape reflected in a digital image is represented by a set of points. The second skeleton calculation section 32 removes branch lines to the skeleton from a vertex of the figure in the calculated first figure skeleton to obtain the second figure skeleton. The coordinate transformation section 33 defines the curve coordinate system in which the second figure skeleton is one coordinate axis and the distance between the second figure skeleton and the outline of the figure is the other coordinate axis to transform the coordinate of a point on the outline of the figure into the other coordinate axis of the curve coordinate system with respect to the data obtained by one circulation of the outline of the figure using one end point of the second figure skeleton as a start point and the other end point as a terminal point.

It is to be noted that although an outline extraction section 34 is not essential, as shown in FIG. 18, the section may also be disposed. The section acquires a plurality of points corresponding to positions of the schematic outline with respect to the image of the inspection object pattern, prepares a Voronoi diagram using the plurality of points as generatrices, and searches edges along the sides of the prepared Voronoi diagram. When the edge is found, all branches connected to the edge are removed, and a curve coordinate system is constituted using one coordinate axis of the curve coordinate in the remaining Voronoi diagram from which the branches are removed. The edge is searched along an axis which does not correspond to the Voronoi diagram of the curve coordinate to extract the outline of the figure.

Furthermore, a comparison section 35 may also be disposed. The section compares the point on each figure substantially or completely matching projection onto the coordinate axis corresponding to the skeleton of the figure of the curve coordinate system with a value of projection onto the other coordinate axis which does not correspond to the skeleton of the figure of the curve coordinate system with respect to either one of at least two figures to be compared, represented using the graphic processing, and the other figure whose coordinate has been transformed by the curve coordinate system prepared when obtaining graphic representation. The two figures are compared with each other. Operation contents of the outline extraction section 34 and comparison section 35 may also include the processing contents of the first to sixth embodiments.

Figure 19:
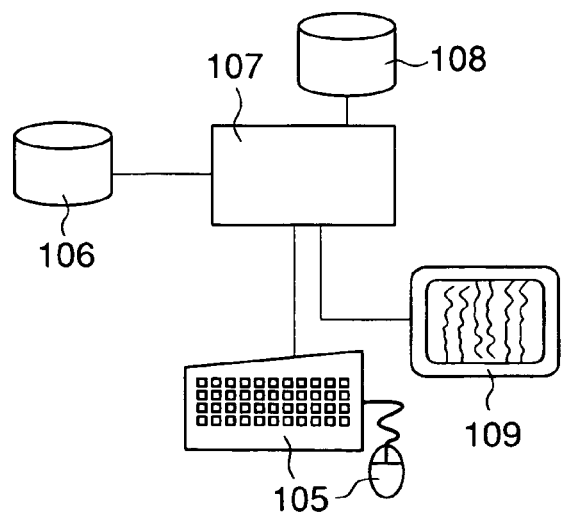
FIG. 19 is a block diagram showing a constitution in a case where the graphic processing device according to the seventh embodiment of the present invention is applied to an inspection apparatus of a fine pattern.

It is to be noted that the graphic processing device 30 according to the seventh embodiment may also be applied to an inspection apparatus of a fine pattern, shown in a block diagram of FIG. 19. A constitution of the fine pattern inspection apparatus to which the graphic processing device is applied will be described with reference to FIG. 19. In FIG. 19, the fine pattern inspection apparatus includes: an input section 105 including a keyboard, a mouse and the like for inputting data; a storage section 106 in which polygon data or the like is stored as the above-described graphic data; a computation section 107 for performing various computations concerning inspection of a fine pattern; a storage section 108 in which operation software of a graphic processing program or the like in an eighth embodiment described later is stored; and a display section 109 which displays digital image data such as the fine pattern. An operation of the fine pattern inspection apparatus which is a detailed constitution of the seventh embodiment includes the contents described in the first to sixth embodiments.

Eighth Embodiment

Next, a content of a recording medium in which graphic processing program stored in the storage section 108 of the fine pattern inspection apparatus described with reference to FIG. 19 is recorded will be described. It is to be noted that the graphic processing program according to the eighth embodiment is capable of operating in a computer system similar to the fine pattern inspection apparatus of FIG. 19. Therefore, constituting elements of the apparatus of FIG. 19 will be diverted to a constituting section which processes the following procedure and described.

The graphic processing program recorded in the recording medium according to the eighth embodiment stores: a first procedure for acquiring a shape of an object as digital image data to store the data in the storage section 106 of the computer; a second procedure for inputting an outline of the object shape reflected in a digital image stored in the storage section 106 as the digital image data, and allowing the computation section 107 of the computer to calculate a first figure skeleton apart from the outline of the figure by each equal distance in a central direction of the figure using at least one of a medial axis and a chordal axis with respect to the figure represented by a set of points; a third procedure for removing branch lines from a vertex of the figure to the skeleton in the first figure skeleton calculated by the computation section 107, and allowing the computation section 107 to calculate a second figure skeleton; and a fourth procedure for defining a curve coordinate system in which the second figure skeleton is one coordinate axis and a distance between the second figure skeleton and the outline of the figure is the other coordinate axis with respect to data obtained by one circulation of the outline of the figure using one end point of the second skeleton figure as a start point and the other end point as a terminal point, and allowing a coordinate transformation section also constitute of the computation section 107 to transform the coordinate of the point on the outline of the figure into the other coordinate axis of the curve coordinate system. The figure concerning the shape of the object is processed in accordance with the image by the computer.

Constitution in Embodiments

Essential constitution of embodiments of the present invention described above will be combined and described hereinafter. A graphic processing method according to a basic concept of the present invention includes: a step of calculating a skeleton of a figure whose outline is represented by a set of points; a step of defining a curve coordinate system in which the skeleton is used as one coordinate axis; and a step of transforming a coordinate of the point of the figure as the point on the curve coordinate system.

That is, in summary, the present invention provides the following constitutions. First, a first figure represented by a vertex string is regarded as a reference figure, a second figure represented by a vertex string is regarded as a figure to be compared with a reference, a chordal axis is defined at least one of the figures, the above-described figure is represented by a curve coordinate system in which the chordal axis is regarded as a coordinate axis, and a difference between both shapes is evaluated in a method of comparing the figures. A method of judging whether or not a pattern shape is satisfactory by the graphic processing method is also included. Furthermore, a program recording medium in which the method is stored in a computer readable manner, and an inspection apparatus of a fine pattern on which the program is mounted are included.

It is to be noted that in the basic concept, the set of points are obtained as a result of an edge extraction performed with respect to the digital image acquired using digital image forming means including an optical microscope, electronic microscope, and camera. In the basic concept, the skeleton of the figure is formed using a part of a Voronoi diagram of points constituting the figure. Furthermore, the skeleton of the figure uses at least a part of a medial axis or a chordal axis of the figure. Furthermore, as the set of points, graphic data extracted from the data processed by a CAD tool or data in which the points constituting the graphic data are numbered is used. Additionally, as the set of points, data is used including numbered points constituting the outline of the figure extracted from data for use in photo mask drawing or EB drawing. As the set of points, data is used including numbered points constituting the outline of the figure extracted from the data prepared by simulation of a part of a semiconductor working process.

Moreover, the points constituting the figure are points representing a figure by a graph obtained by drawing the points constituting the figure, assuming that one coordinate axis corresponding to the skeleton of the original figure is a horizontal axis and that the other coordinate axis which does not correspond to the skeleton of the original figure is a vertical axis. In this constitution, a curve indicating a limit of a range of tolerated shapes represented by the same coordinate system may also be drawn by the graph.

It is to be noted that in a method of comparing the figures using the above-described method of representing the figure, a point on each figure substantially or completely matching projection onto the coordinate axis corresponding to the skeleton of the figure of the curve coordinate system may also be compared with a value of projection onto the other coordinate axis that does not correspond to the skeleton of the figure of the curve coordinate system with respect to either one of at least two figures to be compared, represented using the graphic representing method, and the other figure whose coordinate has been transformed by the curve coordinate system prepared when obtaining graphic representation. In this constitution, the figure for producing the curve coordinate may be data for use in CAD data, photo mask drawing, and EB drawing, or data prepared by simulation of a part of the working process.

Moreover, in the above-described constitution, after further performing coordinate transformation with respect to at least two figures to be compared, represented using the graphic representing method, in such a manner that the coordinate axes prepared from the skeletons of the respective figures match each other, one of at least two obtained curve coordinate systems is used. Then, the point on each figure substantially or completely matching the projection onto the coordinate axis corresponding to the skeleton of the figure of the curve coordinate system may also be compared with the value of the projection onto the other coordinate axis which does not correspond to the skeleton of the figure of the curve coordinate system. Furthermore, with respect to the figure represented using the graphic representing method, and the curve indicating the limit of the range of the tolerated shapes represented by the same coordinate system, the point on each figure substantially or completely matching projection onto the coordinate axis corresponding to the skeleton of the figure of the curve coordinate system may also be compared with the value of the projection onto the other coordinate axis which does not correspond to the skeleton of the figure of the curve coordinate system.

It is to be noted that in the method of comparing the figures using the graphic processing method, either one of at least two figures to be compared, which is represented using the graphic representing method, and the other figure whose coordinate is transformed by the curve coordinate prepared during the representing of the figure are integrated by a coordinate corresponding to the skeleton of the figure of the curve coordinate system to obtain and prepare the curve. Then, the point on each figure substantially or completely matching projection onto the coordinate axis corresponding to the skeleton of the figure may also be compared with each integrated value.

Moreover, the method of comparing the figures may also include a step of inversely transforming a portion having a large difference from the reference figure, or a region between optional intersections of the curve indicating the limit of the range of the tolerated shapes with the inspection object figure into the original Descartes coordinate system.

It is to be noted that in a method of judging whether or not the shape of the figure is satisfactory using the method of comparing the figures, it is judged whether or not the curve of the inspection object figure represented by the curve coordinate intersects with the curve indicating the limit of the range of the tolerated shapes. When the curves do not intersect with each other, and the curve of the inspection object figure exists inside the range of the tolerated shapes, an inspection result is judged to be satisfactory, and a result in the other case may also be judged not to be satisfactory. In the method of judging whether or not the shape of the figure is satisfactory using the method of comparing the figures, the integrated and normalized values of the reference figure and the inspection object figure are compared with each other on the corresponding curve coordinate, and a Kolmogorov-Smirnov test is conducted using the value at which an absolute value of the difference between two figures is maximum. Then, agreement between the inspection object figure and the reference figure is estimated, and it may be judged whether or not the inspection object figure is satisfactory in accordance with the result.

Moreover, in the graphic representing method using the graphic processing method, in the graph, the portion having a large difference from the reference figure, or the region between optional intersections of the curve indicating the limit of the range of the tolerated shapes with the inspection object figure may also be emphasized, superposed, and displayed.

The method of extracting the outline of the figure using the graphic processing method includes: a step of acquiring a plurality of points corresponding to a position of the schematic outline of an image of an inspection object pattern; a step of preparing a Voronoi diagram using the points as generatrices; a step of removing all branches connected to an edge found by searching edges along sides of the Voronoi diagram; a step of constituting a curve coordinate using the remaining Voronoi diagram as one coordinate axis of the curve coordinate; and a step of searching the edges along an axis of the curve coordinate, which does not correspond to the Voronoi diagram.

It is to be noted that an inspection apparatus of a fine pattern using the graphic processing method according to the embodiments of the present invention includes: a storage section in which reference figure data and inspection object figure data are stored; a storage section capable of storing the above-described graphic processing program; and a result display section in which an execution result of the graphic processing program is displayed.

As described above in detail, according to the graphic processing method of the present invention, the representing of the shape of the figure, which has heretofore been difficult, is facilitated. Furthermore, the represented figures can be quantitatively compared. Furthermore, subjectivity or option is prevented from being caused by differences among those who perform judgment, and objective judgment can be performed.

What is claimed is:

1. A graphic processing method in which a figure concerning a shape of an object is processed by an image, comprising:
    calculating a first figure skeleton apart from an outline of the figure by each equal distance in a central direction of the figure using at least one of a medial axis and a chordal axis with respect to a figure which represents the outline of the object shape reflected in a digital image by a set of points;
    removing branch lines from a vertex of the figure to the skeleton in the calculated first figure skeleton to obtain a second figure skeleton; and
    defining a curve coordinate system in which the second figure skeleton is one coordinate axis and a distance between the second figure skeleton and the outline of the figure is the other coordinate axis with respect to data obtained by one circulation of the outline of the figure using one end point of the second figure skeleton as a start point and using the other end point as a terminal point to transform the coordinate of points on the outline of the figure into the other coordinate axis of the curve coordinate system; and
    displaying a processing result based on processing the coordinate-transformed points.

2. The graphic processing method according to claim 1, wherein the points constituting the figure represent the figure by a graph obtained by drawing the points constituting the figure using one coordinate axis corresponding to the skeleton of an original figure as a horizontal axis and using the other coordinate axis that does not correspond to the skeleton of the original figure as the other coordinate axis.

3. The graphic processing method according to claim 2, further comprising:
    emphasizing, superposing, and displaying a portion having a large difference from the reference figure, or a region between intersections of a curve indicating a limit of a range of tolerated shapes with an inspection object figure on the graph.

4. The graphic processing method according to claim 1, further comprising:
    comparing points on each figure matching projection onto the coordinate axis corresponding to the skeleton of the figure of the curve coordinate system with values of projection onto the other coordinate axis that does not correspond to the skeleton of the figure of the curve coordinate system with respect to either one of at least two figures to be compared, represented using the graphic processing, and the other figure whose coordinate has been transformed by the curve coordinate system prepared when obtaining graphic representation.

5. The graphic processing method according to claim 4, further comprising:
    further performing coordinate transformation with respect to at least two figures to be compared, represented using the graphic processing, in such a manner that the coordinate axes prepared from the skeletons of the respective figures match each other; subsequently using one of at least two obtained curve coordinate systems; and comparing the points on each figure matching the projection onto the coordinate axis corresponding to the skeleton of the figure of the curve coordinate system with the values of the projection onto the other coordinate axis that does not correspond to the skeleton of the figure of the curve coordinate system to compare the two figures.

6. The graphic processing method according to claim 4, further comprising:
    comparing the points on each figure matching the projection onto the coordinate axis corresponding to the skeleton of the figure of the curve coordinate system with the values of the projection onto the other coordinate axis that does not correspond to the skeleton of the figure of the curve coordinate system to compare the two figures with respect to the figure represented using the graphic processing method and the curve indicating the limit of the range of the tolerated shapes represented by the same coordinate system.

7. The graphic processing method according to claim 6, further comprising:

judging whether or not the curve of the inspection object figure represented by the curve coordinate intersects with the curve indicating the limit of the range of the tolerated shapes; judging that an inspection result is satisfactory in a case where the curves do not intersect with each other and the curve of the inspection object figure exists inside the range of the tolerated shapes; and judging that the inspection result is not satisfactory in the other case.

8. The graphic processing method according to claim 7, further comprising:

comparing the integrated values of the reference figure and the inspection object figure with each other on the corresponding curve coordinate; performing a Kolmogorov-Smirnov test using the value at which an absolute value of the difference between two figures is maximum; estimating agreement between the inspection object figure and the reference figure; and judging whether or not the inspection object figure is satisfactory in accordance with the result.

9. The graphic processing method according to claim 6, further comprising:

integrating either one of at least two figures to be compared, represented using the graphic processing method, and the other figure whose coordinate has been transformed by the curve coordinate prepared when representing the figure on the coordinate corresponding to the skeleton of the figure of the curve coordinate system to prepare a curve; and comparing the points on each figure matching projection onto the coordinate axis corresponding to the skeleton of the figure with the integrated values to compare the two figures.

10. The graphic processing method according to claim 4, further comprising:

inversely transforming a portion having a large difference from the reference figure, or a region between optional intersections of the curve indicating the limit of the range of the tolerated shapes with the inspection object figure into an original Descartes coordinate system to compare the two figures.

11. The graphic processing method according to claim 1, further comprising:

acquiring a plurality of points corresponding to a position of the outline of an image of an inspection object pattern; preparing a Voronoi diagram using the plurality of points as generatrices; removing all branches connected to an edge found by searching edges along sides of the prepared Voronoi diagram; constituting a curve coordinate system using the remaining Voronoi diagram from which the branches have been removed as one coordinate axis of the curve coordinate; and searching the edges along an axis of the curve coordinate, which does not correspond to the Voronoi diagram.

12. The graphic processing method according to claim 1, further comprising:

obtaining the first figure skeleton by the medial axis and subsequently removing branch lines from a vertex of the figure to the skeleton to obtain a second figure skeleton; ending searching of distances from a plurality of points on the outline of the figure in a case where a line drawn from the outline at right angles toward the second figure skeleton from the plurality of points crosses the second figure skeleton at right angles; ending the searching of the distances to the second figure skeleton from a place where the line drawn at right angles crosses a distance searching vector using data of the branches removed when obtaining the second skeleton figure as the distance searching vector in a case where the line does not cross the second figure skeleton at right angles; coordinate-transforming a total distance of lengths of the line connecting the point on the outline to the second figure skeleton and the distance searching vector into the other coordinate axis of the curve coordinate system; and processing the figure concerning the shape of the object by the image.

13. A graphic processing apparatus in which a figure concerning a shape of an object is processed by an image, comprising:

a first skeleton calculation section for calculating a first figure skeleton apart from an outline of the figure by each equal distance in a central direction of the figure using at least one of a medial axis and a chordal axis with respect to a figure which represents the outline of the object shape reflected in a digital image by a set of points;

a second skeleton calculation section for removing branch lines from a vertex of the figure to the skeleton in the calculated first figure skeleton to obtain a second figure skeleton; and a coordinate transformation section for defining a curve coordinate system in which the second figure skeleton is one coordinate axis and a distance between the second figure skeleton and the outline of the figure is the other coordinate axis with respect to data obtained by one circulation of the outline of the figure using one end point of the second figure skeleton as a start point and using the other end point as a terminal point to transform the coordinate of points on the outline of the figure into the other coordinate axis of the curve coordinate system.

14. The graphic processing apparatus according to claim 13, wherein the points constituting the figure represent the figure by a graph obtained by drawing the points constituting the figure using one coordinate axis corresponding to the skeleton of an original figure as a horizontal axis and using the other coordinate axis that does not correspond to the skeleton of the original figure as the other coordinate axis.

15. The graphic processing apparatus according to claim 13, further comprising:

a comparison section for comparing points on each figure matching projection onto the coordinate axis corresponding to the skeleton of the figure of the curve coordinate system with values of projection onto the other coordinate axis that does not correspond to the skeleton of the figure of the curve coordinate system to compare two figures with respect to either one of at least two figures to be compared, represented using the graphic processing, and the other figure whose coordinate has been transformed by the curve coordinate system prepared when obtaining graphic representation.

16. The graphic processing apparatus according to claim 13, further comprising:

an outline extraction section for acquiring a plurality of points corresponding to a position of the outline of an image of an inspection object pattern, preparing a Voronoi diagram using the plurality of points as generatrices, removing all branches connected to an edge found by searching edges along sides of the prepared Voronoi diagram, constituting a curve coordinate system using the remaining Voronoi diagram from which the branches have been removed as one coordinate axis of the curve coordinate, and searching the edges along an axis of the curve coordinate, which does not correspond to the Voronoi diagram.

17. The graphic processing apparatus according to claim 13, wherein the coordinate transformation section obtains the first figure skeleton by the medial axis and subsequently removes branch lines to the skeleton from a vertex of the figure to obtain a second figure skeleton, ends searching of distances from a plurality of points on the outline of the figure in a case where a line drawn from the outline at right angles toward the second figure skeleton from the plurality of points crosses the second figure skeleton at right angles, ends the searching of the distances to the second figure skeleton from a place where the line drawn at right angles crosses a distance searching vector using data of the branches removed when obtaining the second skeleton figure as the distance searching vector in a case where the line does not cross the second figure skeleton at right angles, and coordinate-transforms a total distance of lengths of the line connecting the point on the outline to the second figure skeleton and the distance searching vector into the other coordinate axis of the curve coordinate system.

18. A computer readable medium encoded with computer readable instructions for allowing a computer to process a figure concerning a shape of an object by an image, comprising:

a procedure for acquiring the shape of the object as digital image data to store the data in a storage section of the computer;

a procedure for inputting an outline of the object shape reflected in a digital image stored in the storage section as the digital image data, and allowing a computation section of the computer to calculate a first figure skeleton apart from the outline of the figure by each equal distance in a central direction of the figure using at least one of a medial axis and a chordal axis with respect to the figure represented by a set of points;

a procedure for removing branch lines from a vertex of the figure to the skeleton in the first figure skeleton calculated by the computation section, and allowing the computation section to calculate a second figure skeleton; and a procedure for defining a curve coordinate system in which the second figure skeleton is one coordinate axis and a distance between the second figure skeleton and the outline of the figure is the other coordinate axis with respect to data obtained by one circulation of the outline of the figure using one end point of the second skeleton figure as a start point and the other end point as a terminal point, and allowing a coordinate transformation section of the computer to transform the coordinate of the point on the outline of the figure into the other coordinate axis of the curve coordinate system.

19. The graphic processing program recording medium according to claim 18, wherein the points constituting the figure processed by the computation section represent the figure by a graph obtained by drawing the points constituting the figure using one coordinate axis corresponding to the skeleton of an original figure as a horizontal axis and using the other coordinate axis that does not correspond to the skeleton of the original figure as the other coordinate axis.

20. The graphic processing program recording medium according to claim 18, further comprising:

a procedure for comparing points on each figure matching projection onto the coordinate axis corresponding to the skeleton of the figure of the curve coordinate system with values of projection onto the other coordinate axis that does not correspond to the skeleton of the figure of the curve coordinate system to compare two figures with respect to either one of at least two figures to be compared by a comparison section of the computer, represented using the graphic processing, and the other figure whose coordinate has been transformed by the curve coordinate system prepared when obtaining graphic representation.

21. The graphic processing program recording medium according to claim 18, wherein the computation section further comprises a procedure for acquiring a plurality of points corresponding to a position of the outline of an image of an inspection object pattern, preparing a Voronoi diagram using the plurality of points as generatrices, removing all branches connected to an edge found by searching edges along sides of the prepared Voronoi diagram, constituting a curve coordinate system using the remaining Voronoi diagram from which the branches have been removed as one coordinate axis of the curve coordinate, and searching the edges along an axis of the curve coordinate, which does not correspond to the Voronoi diagram.

22. The graphic processing program recording medium according to claim 18, wherein the computation section further comprises a procedure for obtaining the first figure skeleton by the medial axis and subsequently removing branch lines from a vertex of the figure to the skeleton to calculate a second figure skeleton, ending searching of distances from a plurality of points on the outline of the figure in a case where a line drawn from the outline at right angles toward the second figure skeleton from the plurality of points crosses the second figure skeleton at right angles, ending the searching of the distances to the second figure skeleton from a place where the line drawn at right angles crosses a distance searching vector using data of the branches removed when obtaining the second skeleton figure as the distance searching vector in a case where the line does not cross the second figure skeleton at right angles, and coordinate-transforming a total distance of lengths of the line connecting the point on the outline to the second figure skeleton and the distance searching vector into the other coordinate axis of the curve coordinate system.

* * * * *